US011444659B2

(12) United States Patent
Smits et al.

(10) Patent No.: US 11,444,659 B2
(45) Date of Patent: Sep. 13, 2022

(54) MELT WITH REVERSE POWER FEED

(71) Applicant: NOKIA SOLUTIONS AND NETWORKS OY, Espoo (FI)

(72) Inventors: Berten Smits, Antwerp (BE); Edmond Op De Beeck, Mechelen (BE)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 17/159,933

(22) Filed: Jan. 27, 2021

(65) Prior Publication Data
US 2021/0242904 A1 Aug. 5, 2021

(30) Foreign Application Priority Data
Jan. 30, 2020 (EP) .................................. 20154725

(51) Int. Cl.
H04B 3/54 (2006.01)
(52) U.S. Cl.
CPC ..................................... H04B 3/54 (2013.01)
(58) Field of Classification Search
CPC ........... H04B 3/46; H04B 3/50; H04M 19/08; H04M 2201/80
See application file for complete search history.

(56) References Cited

U.S. PATENT DOCUMENTS

| 2016/0100048 | A1* | 4/2016 | Hillaert | H04M 3/22 379/32.01 |
| 2016/0330334 | A1* | 11/2016 | Cooper | H04M 19/08 |
| 2018/0115436 | A1* | 4/2018 | Withofs | H04L 12/10 |

OTHER PUBLICATIONS

ETSI, "Access, Terminals, Transmission and Multiplexing (ATTM): European Requirements for Reverse Powering of Remote Access Equipment Part 1 Architecture," ETSI Draft; Architecture Part 1 V1.1.3, European Telecommunications Standards Institute (ETSI), Oct. 18, 2012, pp. 1-21.
Thorne, David, et al., "RPF Startup requirements (#2015.0295); bbf2015.295.00," European Telecommunications Standards Institute (ETSI), vol. ATTM, TM6, Mar. 6, 2015, pp. 1-21.
(Continued)

Primary Examiner — David S Huang
(74) Attorney, Agent, or Firm — Tong, Rea, Bentley & Kim, LLC

(57) ABSTRACT

The present document discloses network nodes and apparatuses deployable in network systems. The network node may be coupleable via a transmission line to the apparatus. In particular, the network node may comprise means for receiving supply power from the apparatus via the transmission line; performing a line measurement on the transmission line; and signaling to the apparatus to disconnect from the transmission line, wherein the means may be further configured to perform the line measurement on the transmission line during a period of time when the apparatus is disconnected from the transmission line. The apparatus may comprise means for providing supply power to the network node; monitoring at least one electrical parameter of the transmission line; and disconnecting the apparatus from the transmission line if a predetermined line condition or a power violation is detected such that the network node can perform a measurement on the transmission line.

20 Claims, 9 Drawing Sheets

(56) References Cited

OTHER PUBLICATIONS

Darveau, Michel et al., "Method of disconnecting Exchange feed voltage from RPF lines," ETSI Draft, European Telecommunications Standards Institute (ETSI), vol. ATTM, TM6, Jun. 2, 2015, pp. 1-2.
EP Search Report mailed in corresponding EP 20154725.4 dated Jul. 23, 2020, 10 pages.

* cited by examiner

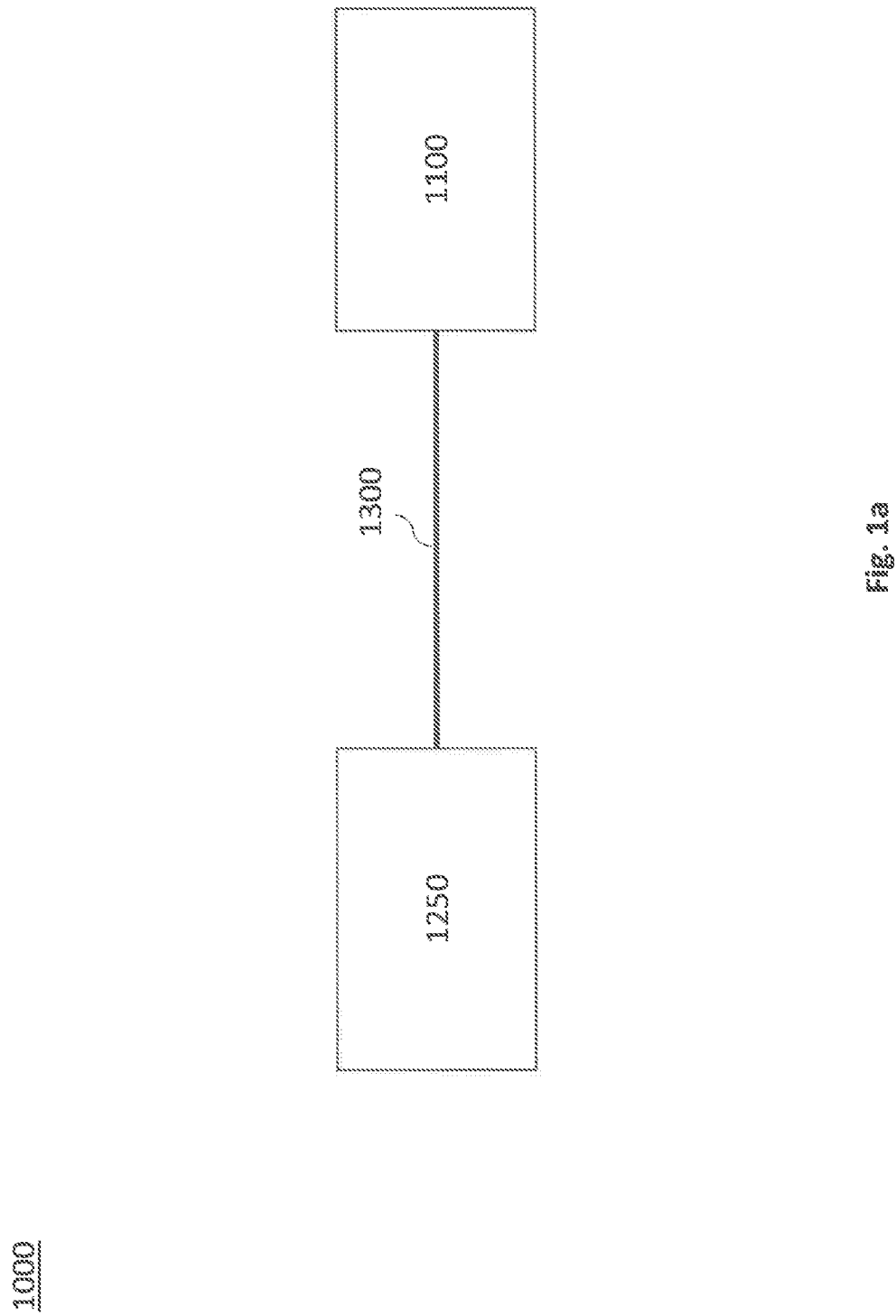

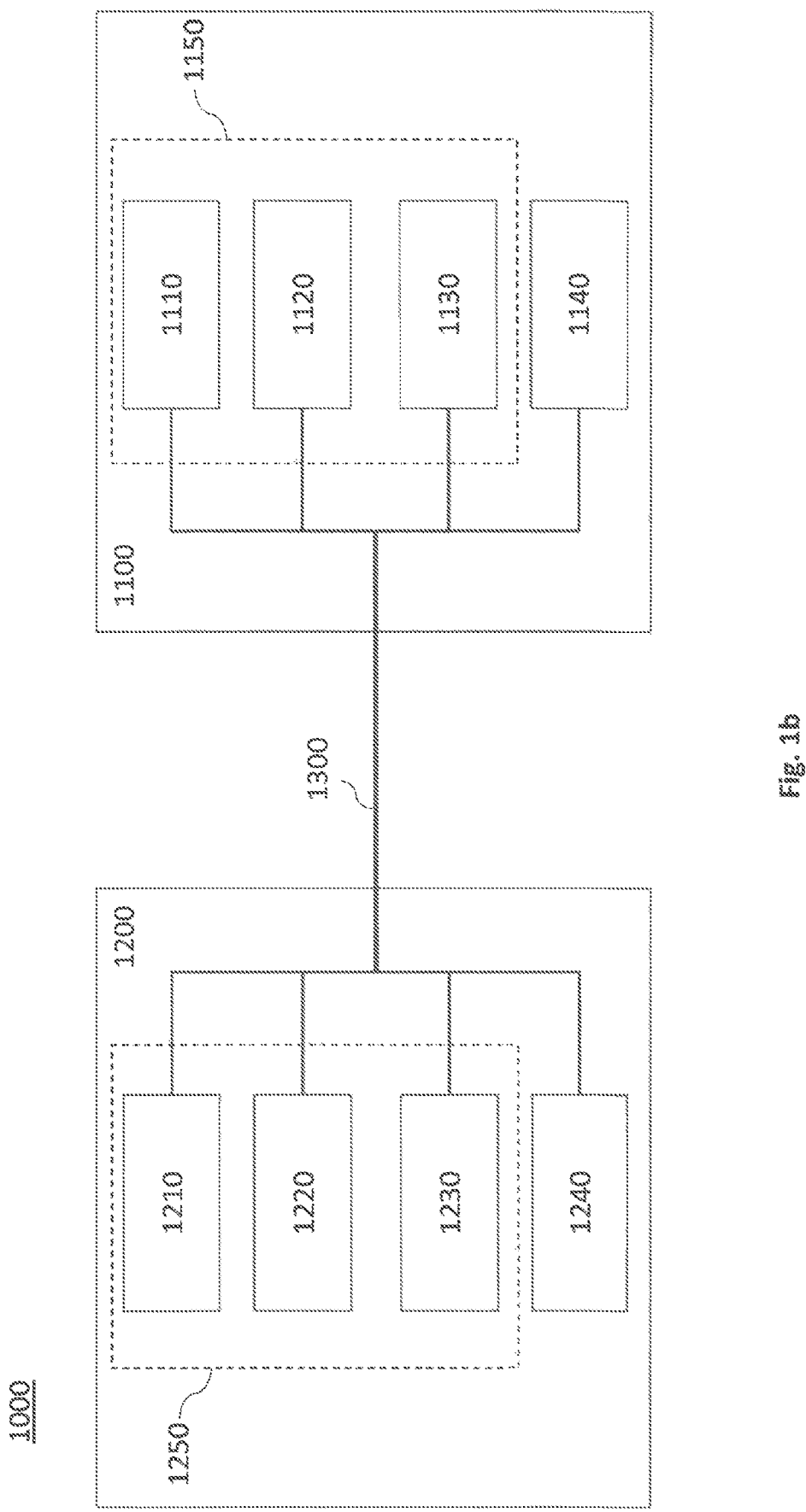

MELT WITH REVERSE POWER FEED

CROSS-REFERENCE TO RELATED APPLICATIONS

This application is based on and claims the benefit of European Patent Application No. 20154725.4, filed on Jan. 30, 2020, which is hereby incorporated herein by reference in its entirety.

TECHNICAL FIELD

The present disclosure generally relates to measurement in network systems. In particular, the present disclosure relates to power management for facilitating measurement in network systems where reverse powering is deployed.

BACKGROUND

Generally speaking, Digital Subscriber Line, hereafter abbreviated in this document by DSL is a family of broadband high-speed technologies, such as Asymmetric DSL (ADSL), Very high bit-rate DSL (VDSL), etc., that are used to transmit digital data over e.g. twisted pair or copper wires.

Typically, in such xDSL network systems, Metallic line testing, hereafter abbreviated in this document by MELT, as defined in ITU-T G.996.2, is a test mechanism for testing twisted pairs. It is typically used to monitor the quality of the twisted pair and to debug issues in the field. Circuitry to perform these measurements are typically integrated at the operator side of the twisted pair loop, for example within a Distribution Point Unit, hereafter abbreviated in this document by DPU. In general, the mechanism relies on measuring foreign DC and AC voltages, resistances and/or capacitances between Tip and Ring, Ring to earth and/or Tip to earth. To perform the resistance and/or capacitance measurements, a test voltage, through a relative high impedance, within the frequency range from DC to 4 kHz may be set between Tip and Ring or between Tip/Ring and earth, such that the resulting current can be measured.

On the other hand, technology like Reverse Power Feed, hereafter abbreviated in this document by RPF has been developed to power the DPUs from the customer or subscriber premises by injecting power on the respective subscriber/DSL lines in addition to the data-carrying signals. However, RPF may typically introduce a voltage source (sometimes also referred to as Power Sourcing Equipment, hereafter abbreviated in this document by PSE) of about 60 V, that is connected to the line via a Power Splitter, hereafter abbreviated in this document by PS. Similarly, at the DPU side, a Power Extractor, hereafter abbreviated in this document by PE is connected via a PS to the line as well. This voltage source typically provides a low output impedance between Tip and Ring on the line, needed to provide DC power to the DPU over the twisted pair. Notably, this voltage source may prevent a DPU from executing MELT tests.

SUMMARY

In view of some or all of the above problems and/or use cases, the present disclosure generally proposes a management mechanism that can be used in network nodes (e.g., Distribution point units) and/or terminal or customer devices/apparatus (e.g., a power supply unit of an end user customer device) deployed in communication networks, such as xDSL technologies based networks.

As a broad aspect, there is provided a network node deployable in a network system (e.g., an xDSL based network system). For instance, the network node may be or form part of a DPU. In particular, the network node may be coupleable (or coupled) to an apparatus via a transmission line. By way of example but not limitation, the apparatus may be or form part of an end user terminal equipment which is typically located at the customer premises. The transmission line may be an xDSL subscriber line (e.g., a twisted pair).

In particular, the network node may comprise means for
  receiving supply power from the apparatus via the transmission line;
  performing a line measurement on the transmission line; and
  signaling to the apparatus to disconnect from the transmission line,
wherein the means are further configured to perform the line measurement on the transmission line during a period of time when the apparatus is disconnected from the transmission line.

In an embodiment, the supply power may be provided using Reverse Power Feeding or any other suitable manner, as will be appreciated by the skilled person. The line measurement may be a MELT as illustrated above or any other suitable test/measurement (or in some cases any other suitable operation). Signaling may take place using e.g., predefined signal(s) via the transmission line to the apparatus, such that the apparatus, upon detection of the predefined signal(s), may be configured to be disconnected from the transmission line.

In an embodiment the means are further configured for:
  applying an invalid or no predefined signature to the transmission line; or
  violating a power constraint for drawing supply power provided from the apparatus.

In a further embodiment the means are further configured to apply the invalid or no predefined signature prior to or during a start-up phase of the reception of the supply power from the apparatus.

In particular, in some cases, the invalid or no predefined signature may be applied to the transmission line in response to a predefined voltage applied by the apparatus to the transmission line.

In some cases, the predefined signature may for instance be a detection signature or a classification signature. As can be understood and appreciated by the skilled person, the detection and/or classification signature may be represented in the form of a predefined resistive (or capacitive) signature or a predefined range of allowable voltage and/or current.

In another implementation, the means are further configured to perform the violation of the power constraint by drawing a current below or above a predefined limit from the transmission line and wherein the violation of the power is performed during an operational phase of the node and reception of the supply power from the apparatus.

The means can also be further configured to detect disconnection of the apparatus from the transmission line by monitoring a quantity indicative of a voltage on the transmission line.

In a further embodiment the means are further configured to signal to the disconnected apparatus via the transmission line for reconnecting the apparatus back to the transmission line.

In a further embodiment the means are further configured to signal to the apparatus to reconnect back to the transmission line by:

applying to the transmission line at least one of an AC signal or a predetermined DC voltage.

Optionally, as will be appreciated by the skilled person, the network node may also comprise means (e.g., a communications unit) for facilitating communications (e.g., data signaling, etc.) between the network node and the apparatus over the transmission line.

Configured as such, the line measurement (e.g., the MELT) may be successfully performed by the network node (e.g., the DPU) on the transmission line in an efficient, flexible and accurate manner, without being affected (or even prevented) by the power supplied from the apparatus.

The means of network node may be further configured to apply an invalid impedance, current or voltage; or in some cases even to not apply any impedance, current or voltage, to the transmission line. In an embodiment the means of the network node may be configured to violate a predefined power constraint e.g. by drawing an invalid supply power from the transmission line that is provided from the apparatus. For instance, if the power constraint is defined as a minimum value/limit (e.g., a Maintain Power Signature current), then violating such power constraint may be to draw no current or a current less than the minimum value/limit (e.g., the Maintain Power Signature current). By contrast, if the power constraint is defined as a maximum value/limit (e.g., a Continuous Output Power), then violating such power constraint may be to draw excessive current, higher than allowed according to the maximum value/limit (e.g., the Maintain Power Signature current).

Configured as such, the invalid (or absent) predefined signature and/or the violation of the power constraint applied to the transmission line by the network node may be easily monitored and detected by the apparatus coupled on the other side of the transmission line.

In some examples, prior to the normal operations (or referred to as the operational phase) of data exchange and power supply, the network node and apparatus may need to pass a certain start-up procedure (or referred to as a start-up phase), for example to assure the operability and/or compatibility of the elements of the network system, particularly in between the network node side and the apparatus (e.g., comprised in an end user terminal), in order to successfully enter the operational phase for exchanging data and/or power. That is to say, during the start-up phase, there has not been any power supplied from the apparatus to the network node yet. For instance, the start-up procedure may be a Metallic Detection based Start-Up protocol, hereafter abbreviated in this document by MDSU.

On the other hand, in some cases, the means may be further configured to perform the violation of the power constraint during the operational phase of the reception of the supply power from the apparatus.

In some examples, the means of the network node may be further configured to detect (and possibly to confirm) the disconnection of the apparatus from the transmission line. For example, the detection of the disconnection may be achieved by monitoring a quantity indicative of a voltage on the transmission line. The quantity indicative of the line voltage on the transmission line may be the line voltage itself, a part or fraction thereof, a current, a resistance, or the like, as will be appreciated by the skilled person. Optionally, (the relevant means) of the network node may be further configured to discharge any residual supply voltage on the line before the line measurements are to be performed.

In some examples, the apparatus may be configured to reconnect itself after being disconnected for a predefined period of time (e.g., 20 seconds). The predefined period of time may be sufficiently long for finishing the line measurement, or in some cases, a group/set of line measurements carried out by the network node.

In some examples, the means of the network node may be further configured to signal to the disconnected apparatus via the transmission line for reconnecting the apparatus back to the transmission line. The signaling for reconnecting the apparatus back on the transmission line may be actively transmitted by the network node before the expiry of the predefined period of time (e.g., 20 seconds), i.e., before the apparatus reconnecting itself. Particularly in some cases, the predefined period of time may be relatively (or even too) long for a network node to be without power supplied from the apparatus under measurement/test. Thus, the procedure of signaling for reconnecting the apparatus back to the transmission line (particularly well before the expiry of the predefined period of time) may be considered to be useful or beneficial in certain scenarios.

In some examples, for signaling to reconnect the apparatus back to the transmission line, the means may be further configured to apply to the transmission line at least one of an AC signal or a predetermined DC voltage (e.g., 50 or 60 V). In particular, the AC signal may be seen as indicative of a power class supported by the network node. The power class may for example be defined in the form of supported maximum power, DC voltage, line current, or a combination thereof; or may be defined in any other suitable manner, as will be appreciated by the skilled person. One example but not limitation of a possible definition of the power class may be the RPF Classes SR1, SR2 and SR3 as specified in ETSI TS 101 548-1. Similarly, the DC voltage may be predetermined to be sufficiently high (e.g., 50 or 60 V), e.g. for being able to indicate absence of an off-hook phone. The signaling generation and transmission process may be achieved by any suitable circuitry (e.g., in some cases, to re-use the circuitry for performing the line measurement), as will be appreciated by the skilled person. For instance, the AC signal may be represented in a form of a Frequency-shift keying, hereafter abbreviated in this document by FSK or Amplitude modulation, hereafter abbreviated by AM signal with sine wave frequencies in the range of 1 kHz to 2.5 kHz. Of course, other suitable signal(s), e.g., different formats and/or combinations, may be used or defined, in order to be able to reconnect the apparatus back to the transmission line.

In some examples, the means of the network node may comprise at least one processor and at least one memory including computer program code, the at least one memory and computer program code being configured to, with the at least one processor, cause the network node at least to perform:

receiving supply power from the apparatus via the transmission line;
    performing a line measurement on the transmission line;
    signaling to the apparatus to disconnect from the transmission line, wherein the line measurement on the transmission line is performed during a period of time when the apparatus is disconnected from the transmission line.

There is also provided an apparatus deployable in a communications network, the apparatus coupleable via a transmission line to a network node, the apparatus comprising means for:

providing supply power to the network node;
    monitoring at least one electrical parameter of the transmission line; and
    disconnecting the apparatus from the transmission line if a predetermined line condition or a power violation is detected such that the network node can perform a measurement on the transmission line.

The network can be an xDSL based network or another wired network over which a communication protocol may be used. By way of example but not limitation, the apparatus may be comprised in a terminal or end user device typically located in the customer premises. In particular, the apparatus may be coupleable (or coupled) to a network node via a transmission line. The network node may be or form part of a DPU and the transmission line may be an xDSL subscriber line (e.g., a twisted pair).

In an embodiment the means are further configured for monitoring the at least one electrical parameter of the transmission line by:

applying a predetermined voltage on the transmission line; and measuring a quantity indicative of an impedance or current on the transmission line.

In an embodiment the predetermined line condition comprises an invalid or absent predefined signature of the network node and the means are further configured to detect the predetermined line condition prior to or during a start-up phase prior to the provision of supply power to the network node.

In a particular implementation the power violation comprises a current drawn by the network node below or above a predefined limit and means are further configured to detect the power violation during an operational phase of the apparatus and during the provision of supply power to the network node.

In another implementation the means are further configured to disconnect the apparatus from the transmission line by:

ceasing to provide supply power to the network node; and providing an (sufficiently high) impedance on the transmission line, so as not to impact the line measurement (e.g., the MELT); or in other words, that is high enough not to (significantly) impact the line measurements.

In an embodiment the high impedance on the transmission line may be determined according to various requirements and may be achieved by using any suitable manner, as will be appreciated by the skilled person. In an embodiment the (sufficiently high) impedance may be determined according to the requirements for performing the MELT measurement, as defined in ITU-T G.996.2, which is incorporated here by reference in its entirety. For instance, the sufficiently high impedance may be in the order of tens of Mega-ohms resistive and less than a few hundreds of pico-Farads (e.g., 500 pF) capacitive. Generally speaking, the impedance value should be high enough such that it can prevent current to be injected from the network node to the apparatus. Furthermore, the impedance introduced on the transmission line by the disconnected apparatus may introduce an error on the MELT measurement(s). In this case, this error should be lower than a predefined accuracy for the MELT measurement(s), e.g., by a factor of two. By way of example but without limitation, testing parameters for MELT testing can be found in ITU-T G.996.2, in particular Tables E1, E2, E3, E4 and E5 which specify the required accuracy of a MELT measurement. Configured as such, particularly by showing a (sufficiently) high impedance on the transmission line, the apparatus may be seen by the network node from the other side of the transmission line as "virtually" disconnected, without the necessity to be actually "physically" disconnected from the transmission line. Consequently, the apparatus, even when being (virtually) disconnected from the transmission line, may still be able to continue monitoring (e.g., the electrical parameters of) the transmission line. Moreover, since the apparatus ceases to provide supply on the transmission line after being disconnect, the network node can apply the measurement (or other operation if necessary) without being affected.

In an embodiment the means are further configured to disconnect the apparatus from the transmission line for a predefined period of time and reconnected back to the transmission line after expiration of the predefined period of time.

In another embodiment the means are further configured for:

monitoring at least one second electrical parameter of the transmission line after the apparatus is disconnected from the transmission line; and if a further predetermined line condition is detected by the apparatus by monitoring at least one second electrical parameter of the transmission line, reconnecting the apparatus back to the transmission line.

In an embodiment the supply power may be provided using RPF or any other suitable manner, as will be appreciated by the skilled person. In particular, the RPF is defined in ETSI TS 101 548-1, which is hereby incorporated by reference in its entirety. By way of example but not limitation, the at least one electrical parameter of the transmission line, may be a resistance, a capacitance, an impedance, a current, a voltage, a combination thereof, or the like.

The apparatus may be disconnected from the transmission line so that a measurement on the transmission line could be executed by the network node. For instance, the line measurement may be a MELT as illustrated above or any other suitable test/measurement (or in some cases any other suitable operation). Optionally, the end-user device (comprising the apparatus) may also comprise means (e.g., a communications unit) for facilitating communications (e.g., data signaling, xDSL, etc.) between the network node and the end-user device via the transmission line. That is to say, the communications between the network node and the end-user device (comprising the apparatus) and the power supply between the apparatus and the network node may share the same transmission line (or the same wires comprised in the transmission line).

Configured as such, the line measurement (e.g., the MELT) may be successfully performed by the network node (e.g., the DPU) on the transmission line in an efficient, flexible and accurate manner, without being affected (or even prevented) by the power supplied from the apparatus.

In some examples, the quantity indicative of an impedance or current may be the measured impedance or current itself, or any other suitable indicative measure (such as a voltage).

In some cases, the predefined signature may for instance be a detection signature or a classification signature. As can be understood and appreciated by the skilled person, the detection and/or classification signature may be represented in the form of a predefined resistive (or capacitive) signature or a predefined range of allowable voltage and/or current.

In an embodiment the means of the apparatus may be further configured to detect the predetermined line condition prior to or during a start-up phase prior to the provision of supply power to the network node. Generally speaking, the start-up phase is for executing certain (start-up) protocol (e.g., the MDSU protocol) to provide a convenient and reliable check prior to providing supply power to the network node. In other words, until the start-up phase successfully finishes, there is no (reverse) power supply from the apparatus to the network node.

In some examples, the power violation may comprise a current drawn by the network node below or above a predefined limit. For instance, if the power constraint is defined as a minimum value/limit (e.g., a Maintain Power Signature current), then violating such power constraint may be to draw no current or a current less than the minimum value/limit (e.g., the Maintain Power Signature current). By contrast, if the power constraint is defined as a maximum value/limit (e.g., a Continuous Output Power), then violating such power constraint may be to draw excessive current, higher than allowed according to the maximum value/limit (e.g., the Maintain Power Signature current). In particular, the power violation may be detected during a normal operational phase when the supply power is provided from the apparatus to the network node.

Configured as such, the detection of the invalid (or absent) predefined signature and/or the violation of the power constraint on the transmission line may be used by the apparatus as an indication (or trigger) to disconnect itself from the transmission line.

In some examples, the means of the apparatus may be configured to disconnect the apparatus from the transmission line for a predefined period of time (e.g., 20 seconds) and to (e.g., automatically) reconnect itself after expiry of the predefined period of time. Generally speaking, the predefined period of time may be configured to be sufficiently long for carrying out the line measurement, or in some cases, a group of line measurements performed by the network node.

In some examples, the means of the apparatus may be further configured for monitoring at least one second electrical parameter (or other electrical parameter if necessary) of the transmission line after the apparatus is disconnected from the transmission line. In particular, if a further predetermined line condition is detected by the apparatus by monitoring at least one second electrical parameter of the transmission line, (the means of) the apparatus may be further configured to (e.g., actively) reconnect the apparatus back to the transmission line. The reconnection of the apparatus back on the transmission line may be performed before the expiry of the predefined period of time (e.g., 20 seconds), i.e., before the apparatus reconnecting itself. Particularly in some cases, the predefined period of time may be relatively or even too long for a network node to be without power supplied from the apparatus under measurement/test. Thus, the procedure of reconnecting the apparatus back to the transmission line (well before the expiry of the predefined period of time) may be considered to be useful or beneficial in certain scenarios.

In some examples, the further predetermined line condition may comprise at least one of an AC signal or a predetermined DC voltage (e.g., 50 or 60 V). In particular, the AC signal may be seen as indicative of a power class supported by the network node. The power class may for example be defined in the form of supported maximum power, DC voltage, line current, or a combination thereof; or may be defined in any other suitable manner, as will be appreciated by the skilled person. One example but not limitation of a possible definition of the power class may be the RPF Classes SR1, SR2 and SR3 as specified in ETSI TS 101 548-1. Correspondingly, as can be understood and appreciated by the skilled person, by decoding (or detecting) the AC signal, the apparatus may verify that there is a network node present and that the (e.g., RPF) class of the apparatus matches the (e.g., RPF) class of the network node. Similarly, the DC voltage may be predetermined to be sufficiently high (e.g., 50 or 60 V) such that, by detecting the predetermined (sufficiently high) DC voltage, the apparatus may verify: 1) absence of a short, as short will lower the DC voltage; 2) absence of an off-hook phone, as an off-hook phone will lower the DC voltage; and 3) absence of an open circuit, otherwise there would not be a DC voltage at the apparatus side. More particularly, the DC part may be set on the transmission line with a high output impedance, such that any off-hook phone would lower the voltage on the line. For instance, the AC signal may be represented in a form of an FSK or AM signal with sine wave frequencies in the range of 1 kHz to 2.5 kHz. Of course, other suitable signal(s), e.g., different formats and/or combinations, may be used or defined, in order to be able to reconnect the apparatus back to the transmission line.

In some examples, the means of the apparatus may comprise at least one processor and at least one memory including computer program code, the at least one memory and computer program code being configured to, with the at least one processor, cause the apparatus at least to provide supply power to the network node; monitor at least one electrical parameter of the transmission line; and disconnect the apparatus from the transmission line if a predetermined line condition or a power violation is detected, such that the network node can perform a measurement on the transmission line.

As another broad aspect, there is provided a method of operating a network node. The network node may be coupleable (coupled) via a transmission line to an apparatus as illustrated above. In particular, the method may comprise receiving supply power from the apparatus via the transmission line; performing a line measurement on the transmission line; and signaling to the apparatus to disconnect from the transmission line. More particularly, the line measurement on the transmission line is performed during a period of time when the apparatus is disconnected from the transmission line.

As another broad aspect, there is provided a method of operating an apparatus. The apparatus may be coupleable (coupled) via a transmission line to a network node as illustrated above. In particular, the method may comprise providing supply power to the network node; monitoring at least one electrical parameter of the transmission line; and disconnecting the apparatus from the transmission line if a predetermined line condition or a power violation is detected such that the network node can perform a measurement on the transmission line.

Notably, the details of the disclosed method can be implemented as a computer program which can be also stored on a non-transitory computer readable medium comprising program instructions.

In particular, it is understood that methods according to the disclosure relate to methods of operating the network node and/or apparatus according to the above example embodiments and variations thereof, and that respective statements made with regard to the apparatuses likewise apply to the corresponding methods, such that similar description may be omitted for the sake of conciseness. In addition, the above aspects may be combined in many ways, even if not explicitly disclosed. The skilled person will understand that these combinations of aspects and features/steps are possible unless it creates a contradiction which is explicitly excluded.

It is also understood that in the present document, the term "couple" or "coupled" refers to elements being in electrical communication with each other, whether directly connected e.g., via wires, or in some other manner (e.g., indirectly). Notably, one example of being coupled is being connected.

Implementations of the disclosed apparatuses may include using, but not limited to, one or more processor, one or more application specific integrated circuit (ASIC) and/or one or more field programmable gate array (FPGA). Implementations of the apparatus may also include using other conventional and/or customized hardware such as software programmable processors.

Other and further example embodiments of the present disclosure will become apparent during the course of the following discussion and by reference to the accompanying drawings.

BRIEF DESCRIPTION OF THE FIGURES

Embodiments of the disclosure are explained below in an exemplary manner with reference to the accompanying drawings, wherein FIG. 1a schematically illustrates a high level example of a network system according to an embodiment of the present disclosure;

FIG. 1b schematically illustrates another high level example of a network system according to an embodiment of the present disclosure;

DETAILED DESCRIPTION

Figure 2:
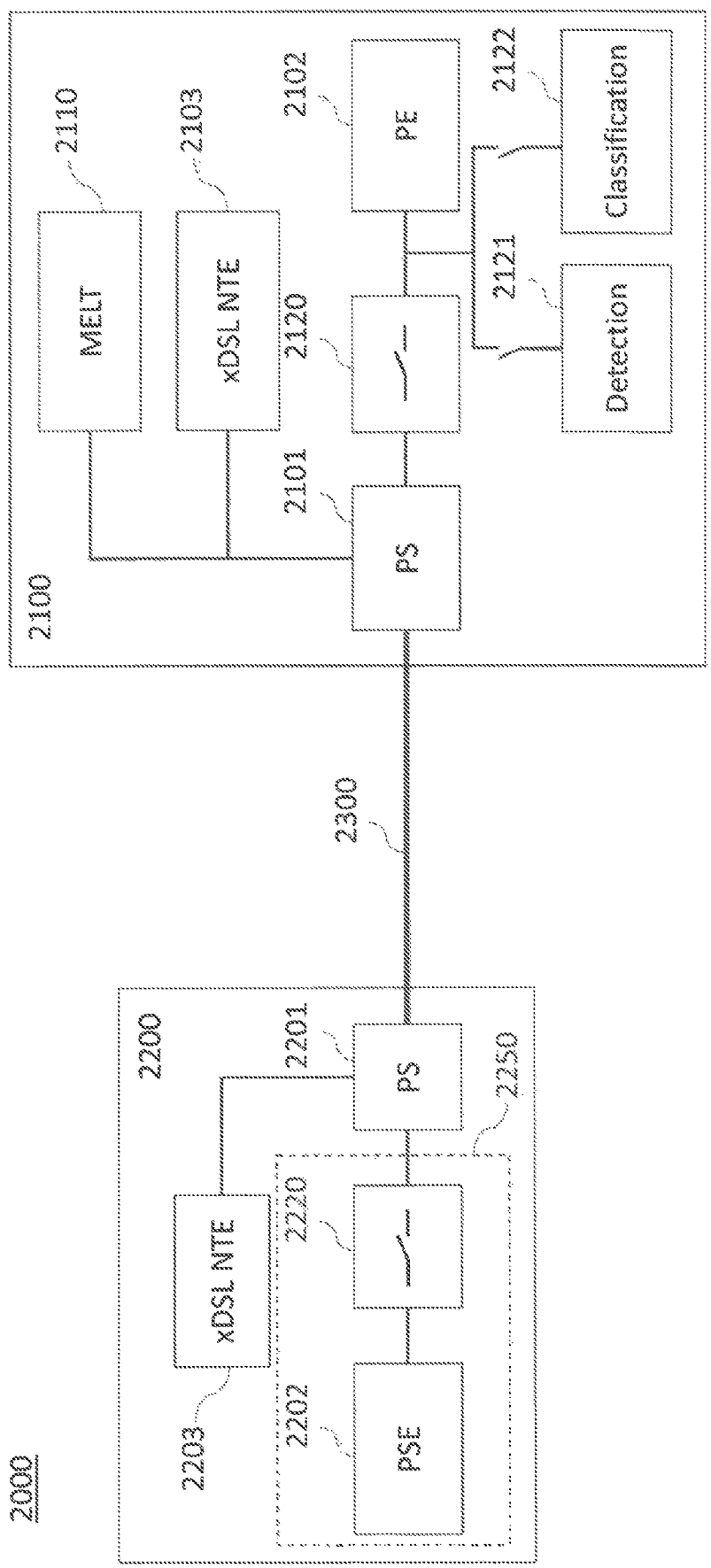
FIG. 2 schematically illustrates an example of a network system according to another embodiment of the present disclosure.

In the following, example embodiments of the present disclosure will be described with reference to the appended figures. In particular, identical elements in the figures may be indicated by identical (or similar) reference numbers, and thus repeated description thereof may be omitted for the sake of conciseness.

FIG. 1a schematically illustrates a high level example of a network node 1100 coupled via a communications (or transmission) line 1300 to an apparatus 1250. The communications line 1300 forms part of a wired communications network over which wired communications protocols may take place, e.g., any suitable wired network technologies such as ADSL, VDSL, G.Fast, MG.Fast, etc. over twisted pair, coax, etc.

FIG. 1b shows the apparatus 1250 forming part of an end-user equipment denoted 1200 as shown in FIG. 1b in which the end user device 1200 further comprises a means 1240 which is configured to be communicatively coupled to a communication means 1140 further comprised in the network node 1100. Both communication means 1240 and 1140 are configured to communicate over said transmission line 1300 using said wired communications protocol.

The network node 1100 is thus typically located at the operator side of said communication network 1000 and the apparatus 1250 is typically located at the customer premises of said communication network 1000. For example, the network node 1100 may be a DPU and the apparatus 1250 may be a power supply unit in the end-user device 1200.

Further, as shown in FIG. 1b the network node 1100 and the end user device 1200 may be coupled (or connected) via a transmission line 1300, such as an xDSL subscriber line (e.g., a twisted pair). As illustrated above, the transmission line 1300 may be used both for exchanging data signals between the network node 1100 and the end user device 1200 and for delivering power from the apparatus 1250 to the network node 1100. Notably, such power supplying from the customer side to the network side may be referred to as the RPF.

More particularly, the network node 1100 may comprise a means 1150 for receiving supply power from the apparatus 1250 via the transmission line 1300; performing a line measurement on the transmission line; and signaling to the apparatus to disconnect from the transmission line.

In an embodiment shown in FIG. 1b, this means 1150 is denoted as comprising three separate functional units 1110, 1120 and 1130, but in other embodiments other configurations are possible.

In the embodiment of FIG. 1b, means 1110 is configured for receiving power from the apparatus 1250 via the transmission line 1300. Means 1120 is configured for performing a line measurement on the transmission line 1300. The line measurement may be a MELT measurement. In addition, the network node 1100 may further comprise means 1130 for signaling to the apparatus 1250 to disconnect from the transmission line 1300. Notably, the means 1120 may be further configured to perform the line measurement on the transmission line 1300 during a period of time when the apparatus 1250 is disconnected from the transmission line 1300.

Similarly on the other side, the apparatus 1250 of FIG. 1a may comprise means for providing supply power to the network node; monitoring at least one electrical parameter of the transmission line; and disconnecting the apparatus from the transmission line if a predetermined line condition or a power violation is detected such that the network node can perform a measurement on the transmission line.

In the embodiment of FIG. 1b, the apparatus 1250 is depicted as comprising three separate means: means 1210 for providing supply power to the network node 1100 via the transmission line 1300, means 1220 for monitoring at least one electrical parameter of the transmission line 1300, such as a quantity indicative of an impedance, a current, or the like, and means 1230 for disconnecting the apparatus 1250 from the transmission line 1300 if a predetermined line condition or a power violation is detected such that the network node 1100 can perform a measurement (e.g., the MELT) on the transmission line 1300.

Broadly speaking, the present disclosure proposes a simple mechanism, driven by the network node 1100 (e.g., a DPU), to disconnect (and optionally reconnect) the apparatus 1250 from the transmission line 1300, such that a (e.g., MELT) measurement can be executed by the measurement means 1120 (which may be implemented as any suitable testing/measurement circuitry) of network node 1100. Put differently, for the network node 1100 to be able perform a MELT measurement, it shall instruct the apparatus 1250 to cease providing power and disconnect itself from the transmission line 1300 and possibly to provide a (sufficiently) high impedance to the line 1300, such that the apparatus 1250 will not (significantly) impact the capacitance, resistance and foreign voltage measurements by the measurement means 1120 within the network node 1100. In particular, the impedance should be high enough not to (significantly) impact the line measurements (e.g., the MELT), and this may be achieved by any suitable manner, as will be appreciated by the skilled person. In an embodiment the (sufficiently high) impedance may be determined according to the requirements for performing the MELT measurement, as defined in ITU-T G.996.2, which is hereby incorporated by reference in its entirety. For instance, the sufficiently high impedance may be in the order of tens of Mega-ohms resistive and less than a few hundreds of pico-Farads (e.g., 500 pF) capacitive. Generally speaking, the impedance value should be high enough such that it can prevent current to be injected from the network node to the apparatus. In some cases, the impedance introduced on the transmission line 1300 by the disconnected apparatus 1250 may introduce an error on the MELT measurement(s). In this case, this error should be lower than a predefined accuracy for the MELT measurement(s), e.g., by a factor of two. By way of example but not limiting, testing parameters for MELT testing can be found in ITU-T G.996.2, in particular Tables E1, E2, E3, E4 and E5 which specify the required accuracy of a MELT measurement. ITU-T G.996.2 and in particular Tables E1, E2, E3, E4 and E5 are incorporated by reference.

FIG. 2 schematically illustrates an example of a network system 2000 according to another embodiment of the present disclosure.

As shown in FIG. 2, the network system 2000 may comprise a network node 2100 which is typically located at the operator side and a terminal node (or an end-user device) 2200 which is typically located at the customer premises. For example, the network node 2100 may be a DPU. Further, the network node 2100 and the terminal node 2200 may be coupled (or connected) via a transmission line 2300, such as an xDSL subscriber line. As illustrated above, the transmission line 2300 may be used both for exchanging data signals between the network node 2100 and the terminal node 2200 and for delivering power from the terminal node 2200 (or particularly from a power supply unit 2250 of the terminal node 2200) to the network node 2100. In particular, the power supply unit 2250 may correspond to an implementation of the apparatus/power supply unit 1250 as shown in FIGS. 1a and 1b. Notably, such power supplying from the customer side to the network side may be referred to as the RPF.

In particular, the terminal node 2200 (or particularly the power supply unit 2250) may comprise a PSE 2202 configured for injecting the power into the transmission line 2300 via a PS 2201. The terminal node 2200 may further comprise an xDSL Network Termination Equipment, hereafter abbreviated in this document by NTE 2203 configured for communicating xDSL broadband signals with the network node 2100 over the transmission line 2300. The PS 2201 may then be further configured to separate the power and the xDSL broadband signals. Notably, even though in the present example of FIG. 2, the power supply unit 2250 is integrated in the terminal node 2200, in some other cases, the power supply unit 2250 may be implemented as a standalone device (or apparatus). Moreover, even though not explicitly shown in the present example of FIG. 2, the terminal node 2200 may comprise any further suitable component and/or circuitry, depending on various circumstances or requirements. By way of example but not limitation, the terminal node may optionally comprise a backup power source for providing backup power in case of a power failure condition; or a power control unit (or circuitry) for controlling the power management behavior, e.g., during the start-up and operational phases.

Similarly on the other side, the network node 2100 may comprise a PE 2102 coupled to the transmission line 2300 with a PS 2101 configured for extracting the power delivered from (the power supply unit 2250 of) the terminal node 2200. In addition, the network node 2100 may also comprise an xDSL NTE 2103 configured for communicating an xDSL broadband signals with the terminal node 2200 over the transmission line 2300 with the help of the PS 2101. In order to monitor the quality of the transmission line 2300 and to debug potential issues in the field, the network node may further comprise means 2110 for performing the line measurement MELT.

Broadly speaking, the present disclosure proposes a simple mechanism, driven by the network node 2100 (e.g., a DPU), to disconnect (and optionally reconnect) the PSE 2202 or the power supply unit 2250 from the transmission line 2300, such that a MELT measurement can be executed by the MELT block 2110 (e.g., implemented as a suitable testing/measurement circuitry) of the network node 2100. Put differently, for the network node 2100 to perform a MELT measurement, it shall instruct the PSE 2202 (or particularly the power supply unit 2250) to cease providing power and disconnect itself from the transmission line 2300 and possibly to provide a sufficiently high impedance to the line 2300, such that the PSE 2202 (or the power supply unit 2250) will not (significantly) impact the capacitance, resistance and foreign voltage measurements by the MELT circuitry 2110 within the network node 2100.

Accordingly, in the example embodiment of FIG. 2, the terminal node 2200 (particularly the power supply unit 2250) may further comprise a PSE disconnect block 2220, whilst the network node 2100 may further comprise a detection signature block 2121, a classification signature block 2122 and a PE disconnect block 2120. In particular, the detection and classification signature blocks 2121 and 2122 may be configured to generate predefined detection and classification signatures respectively, as illustrated above.

On the other hand, the PSE disconnect block 2220 may be configured to disconnect the power supply unit 2250 from the transmission line 2300; and the PE disconnect block 2120 may be configured to disconnect (or block) the PE 2102 and/or possibly the detection and classification signatures 2121 and 2122 from the transmission line 2300, depending on various circumstances (such as the specific phase of operation of the network system).

When the network node 2100 wants to perform a MELT measurement (e.g., either periodically or being triggered), the network node 2100, particularly the PE disconnect block 2120 may be operated (or configured) to disconnect the respective block(s) of the network node 2100, depending on which operation phase the network system is at. For instance, if the terminal node 2200 (or the power supply unit 2250) is not yet started up, or is starting up, the PE disconnect block 2120 may be configured to disable the detection and/or classification signature 2121 and 2122 on the line 2300. Consequently, the disconnection of the detection/classification signatures 2121 and 2122 can prevent the power supply unit 2250 from starting up. On the other hand, if the power supply unit 2250 is already powering the network node 2100 (i.e., during the normal operational phase), the PE disconnect block 2120 may be configured to completely or partially block the PE 2102 from drawing (or extracting) power from the power supply unit 2250. That is, for instance, the network node 2100, particularly the PE 2102 therein, may be configured to draw no current or a current below a predefined current limit from the power supply unit 2250. For instance, the predefined limit may be a Maintain Power Signature current.

On the other side, the terminal node 2200 (or particularly the power supply unit 2250) may be configured to disconnect itself from the transmission line 2300, e.g., by the PSE disconnect block 2220 after detecting either an invalid or absent detection and/or classification signature, during the start-up flow of the power supply unit 2250; or a power violation (e.g., violation of the Maintain Power Signature), during normal operations of the power supply unit 2250 when the power supply unit 2250 is already supplying power to the network node 2100. In particular, the power supply unit 2250 or the terminal node 2200 may be, e.g., with the help of additional monitoring means (such as the monitoring means 1220 in FIG. 1b), further configured to monitor at least one electrical parameter of the transmission line 2300, such as a quantity indicative of an impedance, a current, or the like.

In some cases, the power supply unit 2250 may be disconnected from the transmission line 2300 for a certain (e.g., predefined) time period (which may be referred to as MELT wait time), e.g., 20 seconds.

After expiry of the MELT wait time period, the power supply unit 2250 (or the terminal node 2200) may be configured to reconnect itself back to the line 2300. As will be appreciated by the skilled person, such reconnection may require the power supply unit 2250 to for example perform the start-up procedure (e.g., the MDSU start-up protocol) again before being able to provide power supply to the network node 2100.

Notably, the network node 2100 may make use of this MELT wait time period to perform the MELT measurement(s), or any other suitable operation if necessary. In particular, the network node 2100 may detect the disconnection of the power supply unit 2250 by monitoring the line voltage or any other suitable quantity (e.g., a current or a resistance) indicative of the line voltage. Additionally, the network node may also discharge any residual (e.g., RPF) voltage on the transmission line 2300 before the MELT measurements are to be performed, to make sure that the measurement results are reliable and possibly not affected by any residual voltage on the line 2300.

It is also to be noted that, in order to perform the MELT measurement, the network node (e.g., the DPU) typically requires power. Since the supply power is stopped after the power supply unit 2250 being disconnected, the network node may try to use power either from another transmission line or from a set of transmission lines which reverse power the network node. Or when only the line, which is to be tested, is powering the network node, the network node may rely on (e.g., internal) back-up power to perform the MELT measurement. To reduce the power demand, the network node could also cease providing xDSL service to the line under test.

It is yet to be noted that only in a single box scenario, whereby the power supply unit and NTE are integrated, the xDSL line could be used as a communication channel for the DPU to request the power supply unit to disconnect itself from the twisted pair. This requires that the xDSL line is operational, which could not always be the case when MELT would be used to debug a field issue. In a two-box model, i.e. where the power supply unit is a separate device, such a communication channel is not present. In particular, the present disclosure does not rely on DSL functionality. The communication for disconnect and reconnect from the DPU to the PSE is not using communication functions of DSL. Therefore, the present disclosure is also applicable for a two-box scenario, where power supply unit and NTE are in separate boxes at customer premises, without active communication between this power supply unit and NTE. Further, in a one-box scenario (i.e., the power supply unit and NTE integrated in one box), communication for requesting a disconnect could also be done by using the DSL communication, e.g. over the OAM (Operation and Maintenance) channel to the NTE at customer premises. The NTE could in this case communicate to the power supply unit to disconnect from the line. This, however, requires the functionality of the DSL communication to be active, which is not always present when there is an issue with the communication line. To avoid dependency on the DSL functionality, the present disclosure can be used for a one-box scenario.

Figure 3:
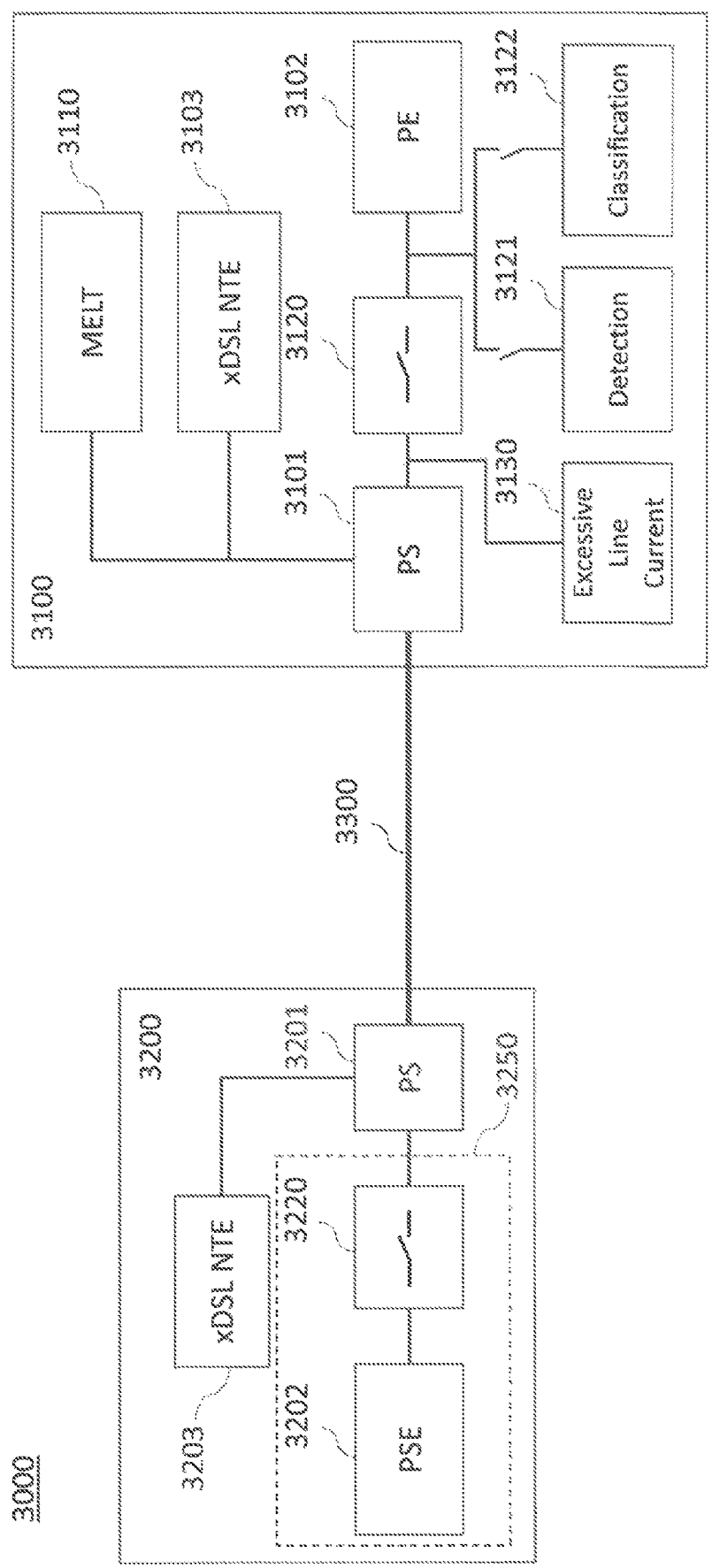
FIG. 3 schematically illustrates an example of a network system according to another embodiment of the present disclosure.

FIG. 3 schematically illustrates an example of a network system 3000 according to another embodiment of the present disclosure. In particular, identical or like reference numbers in FIG. 3 indicate identical or like elements in the network system 2000 as shown in FIG. 2, such that repeated description thereof may be omitted for reasons of conciseness.

Similar as the network system 2000 of FIG. 2, the network system 3000 of FIG. 3 may comprise an xDSL NTE 3203, a PSE 3202, a PSE disconnect block 3220 and a PS 3201 in the terminal node 3200 at the customer premises side; and a MELT block 3110, an xDSL NTE 3103, a PS 3101, a PE disconnect block 3120, a PE 3102, a detection signature block 3121 and a classification block 3122 in the network node 3100 at the network side. In particular, the PSE 3202 and the PSE disconnect block 3220 may be comprised in a power supply unit 3250, similar to the power supply unit 2250 of FIG. 2.

However, compared to the network system 2000 of FIG. 2, the network node 3100 of FIG. 3 may further comprise an additional excessive line current block 3130.

Arranged as such, the PSE disconnect block 3220 may be configured to provide the disconnection of the power supply unit 3250 from the transmission line 3300 and may be operated as described above. Further, the PE disconnect block 3120 may be configured to provide the disconnection of the PE 3102, and/or the detection/classification signatures 3121 and 3122 from the transmission line 3300, and may be operated when a MELT measurement is started, to avoid impact on the MELT measurement. Finally, the excessive line current block 3130 may be configured to provide the required excessive line current to force the power supply unit 3250 to be disconnected from the transmission line 3300.

Accordingly, when the network node 3100 wants to perform a MELT measurement (e.g., either periodically or being triggered), the network node 3100, particularly the PE disconnect block 3120 therein may be operated (or configured) to disable the detection and/or classification signature 3121 and 3122 on the line 3300, particularly if the power supply unit 3250 is not yet started up, or is starting up.

On the other hand, if the power supply unit 3250 is already powering the network node 3100 (i.e., during the normal operational phase), the network node 3100, particularly the excessive line current block 3130 therein, may be configured to draw an excessive line current from the power supply unit 3250, violating a (second) predefined power limit of the power supply unit 3250. The (second) predefined power limit may be a Continuous Output Power limit of the power supply unit 3250. That is, for instance, the network node 3100, particularly the excessive line current block 3130, together with the PE 3102, may be configured to draw a current above the (second) predefined limit (e.g., the Continuous Output Power) from the power supply unit 3250.

Correspondingly, the terminal node 3200 (or particularly the power supply unit 3250) may be configured to disconnect itself from the transmission line 3300 for a certain time period (which may be referred to as MELT wait time), e.g., 20 seconds, after detecting either an invalid or absent detection and/or classification signature, during the start-up phase of the power supply unit 3250; or a power violation (e.g., violation of the Continuous Output Power), during normal operational phase of the power supply unit 3250 when the power supply unit 3250 is already supplying power to the network node 3100. As will be appreciated by the skilled person, this may be achieved by monitoring (using any suitable means or circuitry) at least one electrical parameter (e.g., a resistance, a current, or the like) of the transmission line 3300.

After expiry of the MELT wait time period, the power supply unit 3250 (or the terminal node 3200) may be configured to reconnect itself back to the line 3300. As will be appreciated by the skilled person, such reconnection may require the power supply unit 3250 to for example perform the start-up procedure (e.g., the MDSU start-up protocol) before being able to provide power supply to the network node 3100 again.

Notably, the network node 3100 may make use of this MELT wait time period to perform the MELT measurement (s), or any other suitable operation if necessary. In particular, the network node 3100 may detect the disconnection of the power supply unit 3250 by monitoring the line voltage or any other suitable quantity (e.g., a current or a resistance) indicative of the line voltage. Additionally, the network node 3100 may also discharge any residual RPF voltage on the transmission line 3300 before executing the MELT measurements, to assure reliable measurement results.

It is also to be noted that, in some cases, the maximum allowed time for a single or combined sets of MELT measurements may be set to a relatively long period of time (e.g., 20 seconds or more) for a network node (e.g., a DPU) to be without power supplied from the PSE of the line under test. Thus, there may be a need for the PSE to reconnect itself back to the line and to restart powering the DPU, even before expiry of the predefined period of disconnection time. In some cases, such reconnection of the PSE to the transmission line may be performed bypassing the MDSU start-up protocol.

Figure 4:
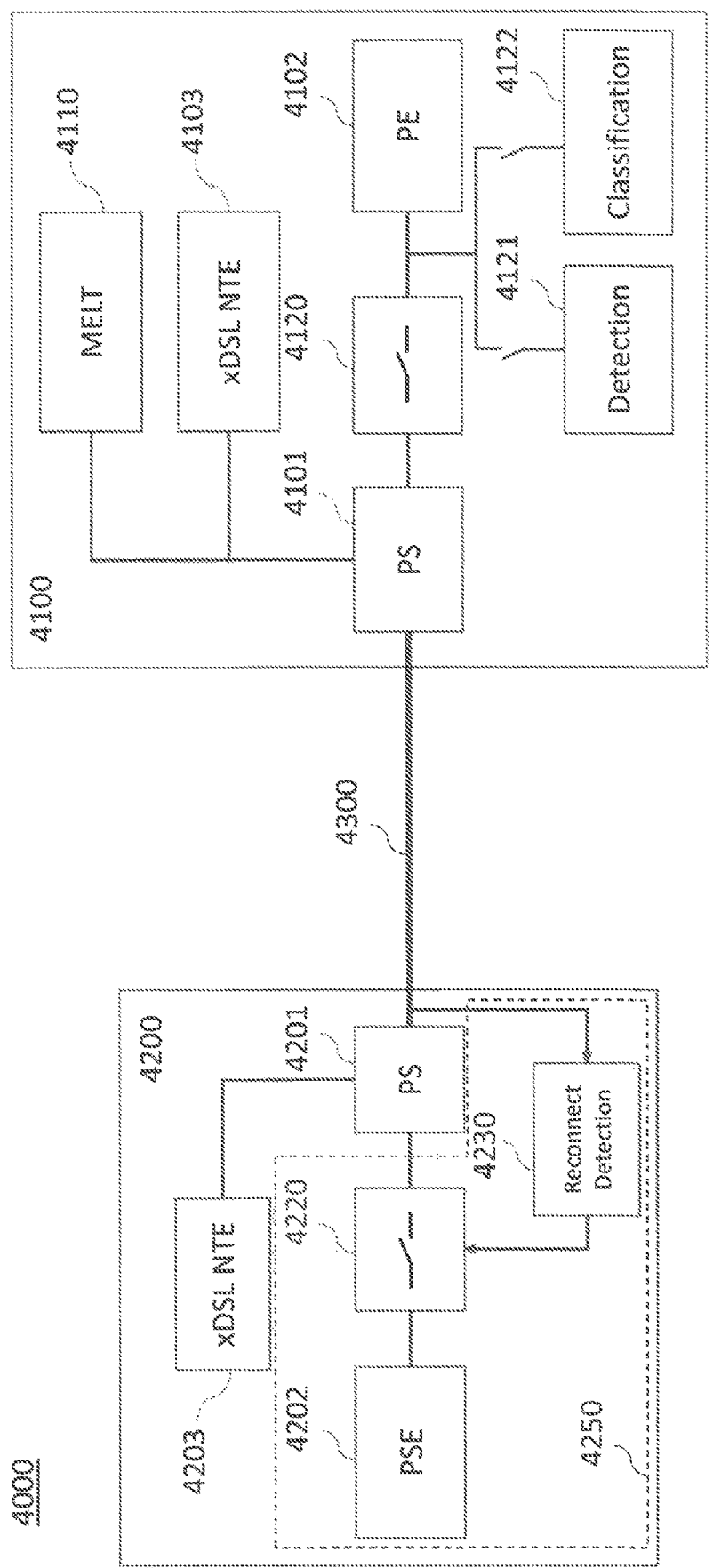
FIG. 4 schematically illustrates an example of a network system according to yet another embodiment of the present disclosure.

FIG. 4 schematically illustrates an example of a network system 4000 according to an embodiment of the present disclosure. In particular, identical or like reference numbers in FIG. 4 indicate identical or like elements in the network system 2000 as shown in FIG. 2, such that repeated description thereof may be omitted for reasons of conciseness.

As can be seen from FIG. 4, in the network system 4000, particularly in the power supply unit 4250, there may further comprise a reconnect detection block 4230. In particular, the reconnect detection block 4230 may be configured for continued monitoring the electrical parameters (e.g., the line voltage) of the transmission line 4300, when the power supply unit 4250 is disconnected. The reconnect detection block 4230 may be configured to reconnect the power supply unit 4250 back to the transmission line 4300 upon detection (or decoding) of a predefined line condition. For instance, in some cases, as the network node may contain suitable MELT circuitry which can introduce AC and DC voltages on the line, the predefined line condition may comprise a specific voltage signaling (e.g., generated using the MELT circuitry) which may include an AC part and a DC part. In particular, as illustrated above, the AC part may convey a (supported) power class of the network node; while the DC part may be used to detected off-hook phones on the twisted pair. That is to say, by decoding (or detecting) the AC signal, the power supply unit 4250 may verify that there is a DPU (network node 4100) present and that the PSE RPF power class matches the DPU RPF power class. Similarly, by detecting a (sufficiently high) DC voltage (e.g., 50 or 60 V), the power supply unit 4250 (particularly by the reconnect detection block 4230) may verify: 1) absence of a short, as short will lower the DC voltage; 2) absence of an off-hook phone, as an off-hook phone will lower the DC voltage; and 3) absence of an open circuit, otherwise there would not be a DC voltage at the PSE side. More particularly, the DC part may be set on the transmission line with a high output impedance, such that any off-hook phone would lower the voltage on the line.

Configured as such, the power supply unit 4250 may be configured to be reconnected back to the transmission line 4300 and possibly to (e.g., immediately) power the network node 4100 upon decoding a supported (e.g., RPF) power class from the AC signal and detecting a predetermined DC voltage. In some cases, the DC voltage may be predetermined to be sufficiently high (e.g., 50 or 60 V), for indicating absence of an off-hook phone. However, as will be appreciated by the skilled person, any other suitable signals or combination thereof may be used to be defined as the to-be-detected line condition, such that it can be easily detected by the power supply unit 4250 (particularly by the reconnect detection block 4230) and reliably considered as a trigger for reconnecting to the transmission line 4300.

Notably, even though the reconnection mechanism as shown in FIG. 4 is applied to the network system of FIG. 2, it may be readily apparent to the skilled person that such reconnection mechanism may be analogously applied to the network system of FIG. 3 (possibly with minor adaptions).

Figure 5:
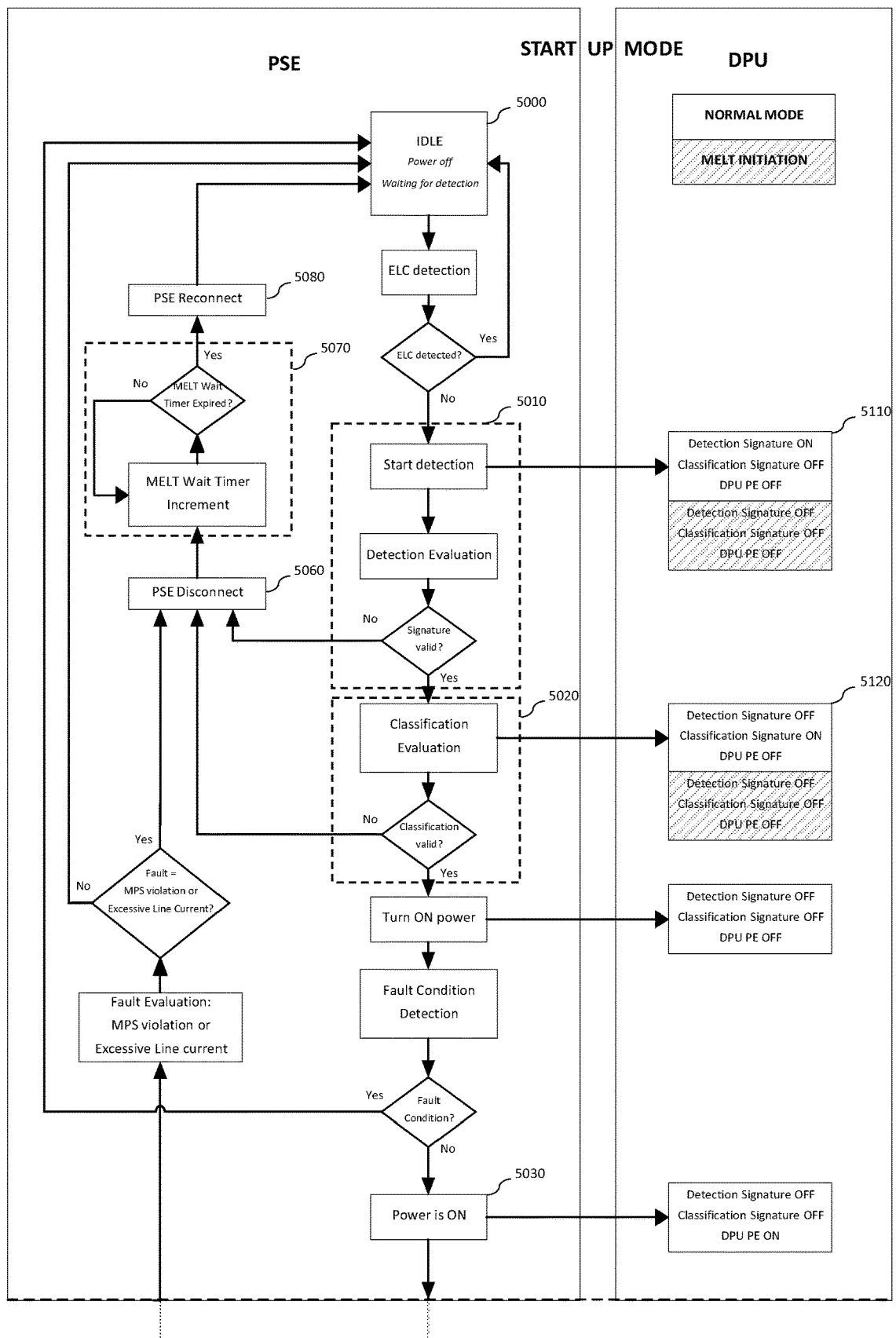
FIG. 5 schematically illustrates an example of a flow chart according to an embodiment of the present disclosure.
Figure 5:
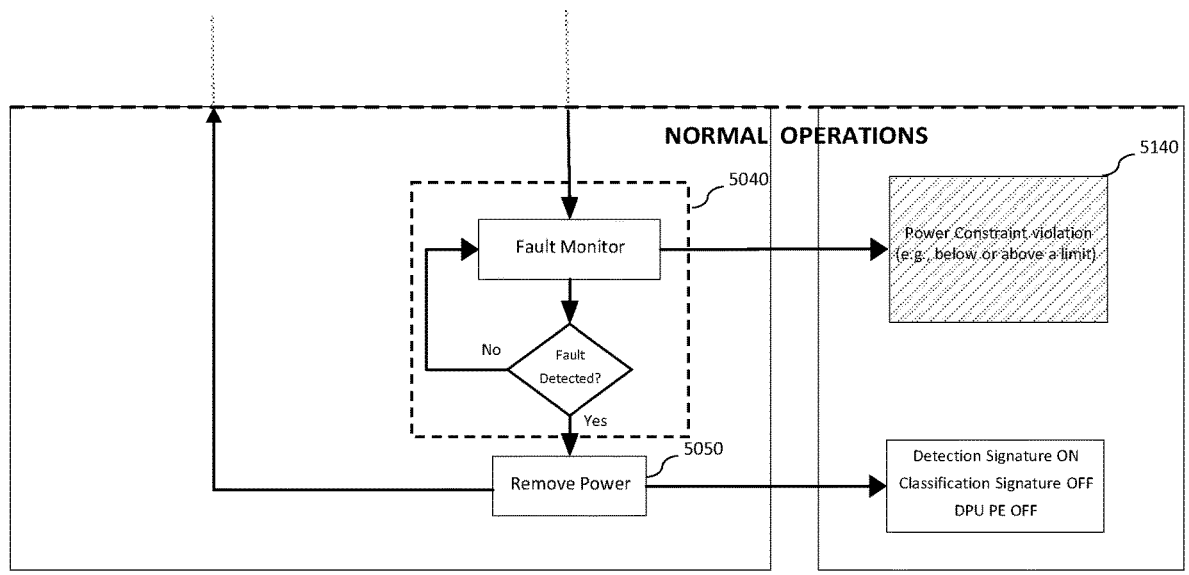

FIG. 5 schematically illustrates an example of a flow chart according to an embodiment of the present disclosure in accordance with the MDSU start-up flow for PSE and DPU as given in TS 101 548-1. In particular, FIG. 5 schematically shows a MDSU start-up flow that may be applied in combination with MELT functionality between a PSE (or particularly a power supply unit) at the customer premises side and a DPU at the operator side. In this sense, the "PSE" in FIG. 5 may be considered to correspond to the power supply unit 2250 or 3250 (comprising the respective PSE 2202 or 3202 and PSE disconnect block 2220 or 3220) in FIG. 2 or 3; and the "DPU" in FIG. 5 may correspond to the respective network node 2100 or 3100 in FIG. 2 or 3. Furthermore, it is to be noted that, as indicated as legend in the DPU of FIG. 5, the white-colored blocks indicate the behavior in the normal mode (or in other words, no need for MELT measurements); while the striped blocks indicate the behavior for initializing or triggering MELT measurements as illustrated above for FIGS. 2 and 3.

Below, only a selection of blocks/steps (which are considered to be more relevant to the present disclosure) from the complete flow chart will be described. However, the other blocks/steps may be considered apparent to the skilled person, such that the respective description thereof may be omitted for the sake of conciseness.

Particularly, as can be seen from FIG. 5, the flow may start with power supply unit being in the idle (or power off) state in 5000. Upon starting up, the power supply unit may go through a process 5010 for detecting and evaluating the detection signature as illustrated above. During this process 5010, the DPU (or the network node) on the other side of the transmission line may be configured to behave in 5110 accordingly depending on whether MELT measurements are to be performed or not. For instance, in normal modes where no MELT measurement is expected, the DPU may be configured to signal the detection signature as defined; whilst if a MELT measurement is to be executed, the DPU may be configured to refrain from signaling any valid detection signature, as illustrated above.

Similarly, in the subsequent process 5020 the classification signature is to be detected and evaluated. On the other side, the DPU may be configured to behave in 5120 accordingly depending on whether MELT measurements are to be performed or not. Particularly, in normal modes where no MELT measurement is expected, the DPU may be configured to signal the classification signature as defined; whilst if a MELT measurement is to be executed, the DPU may be configured to refrain from signaling any valid classification signature, as illustrated above.

If both detection and classification signatures are successfully detected, the power supply unit may be configured to start providing power in 5030 to the DPU and enter the normal operational phase.

If, during normal operations, a power constraint violation performed by the DPU in 5140 is detected by the power supply unit in 5040, the power supply unit may be configured to cease providing power to the DPU in 5050.

The power supply unit may be configured to be disconnected in 5060 from the transmission line if any of the erroneous conditions illustrated above is detected. The power supply unit may be configured to be disconnected for a period of time e.g. according to a MELT wait timer in 5070; and upon expiry of the timer, the power supply unit may be configured to reconnect itself back to the transmission line in 5080 and return to the idle state of 5000.

Figure 6:
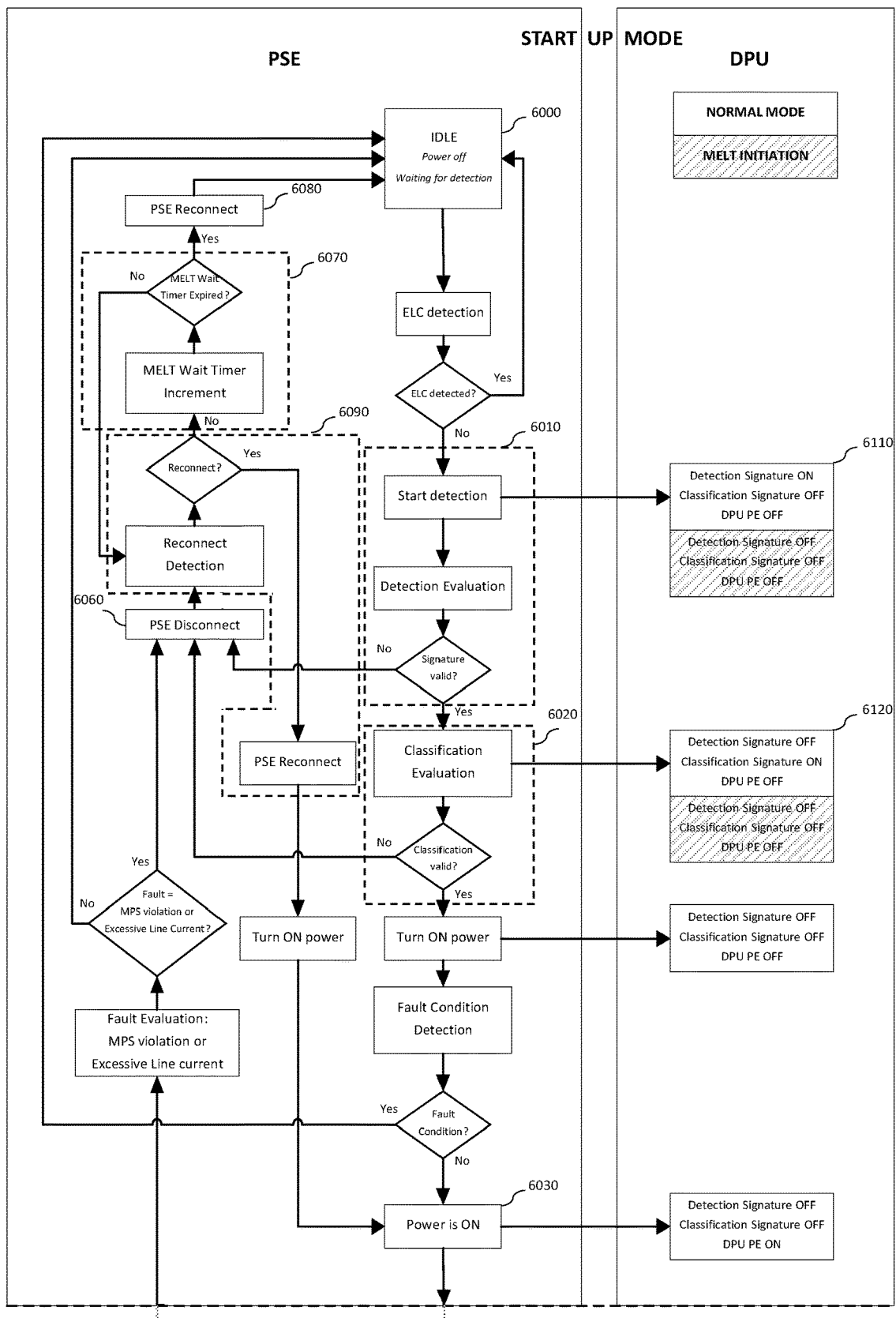
FIG. 6 schematically illustrates an example of a flow chart according to another embodiment of the present disclosure.
Figure 6:
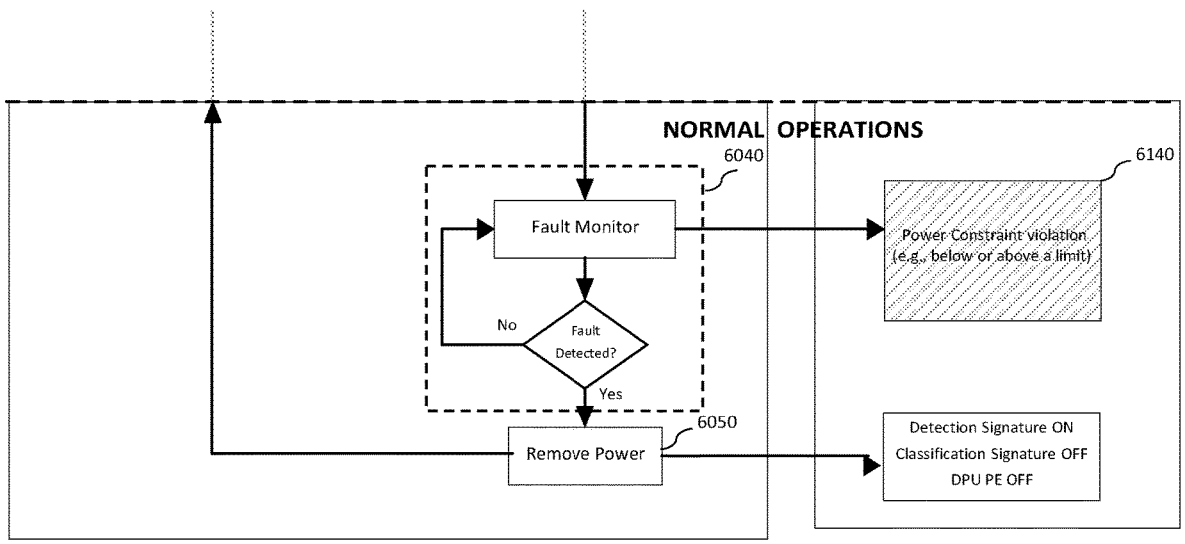

FIG. 6 schematically illustrates an example of a flow chart according to another embodiment of the present disclosure, also in accordance with the MDSU start-up flow for PSE and DPU as given in TS 101 548-1. In particular, identical or like reference numbers in FIG. 6 indicate identical or like elements in the flow chart as shown in FIG. 5, such that repeated description thereof may be omitted for reasons of conciseness.

More particularly, compared to the flow chart of FIG. 5, FIG. 6 additionally shows a reconnection process 6090 wherein the power supply unit (e.g., the power supply unit 4250 of FIG. 4) may be configured to reconnect itself back to the transmission line if a predefined line condition is detected, as illustrated above in details. Configured as such, the power supply unit may not need to wait till the expiry of the predefined MELT wait time and may be capable of being (actively) reconnected if certain line condition(s) is fulfilled, thereby improving the overall efficiency of the network system.

The disclosed example embodiments can be implemented in many ways using hardware and/or software configurations. For example, the disclosed embodiments may be implemented using dedicated hardware and/or hardware in association with software executable thereon. The components and/or elements in the figures are examples only and do not limit the scope of use or functionality of any hardware, software in combination with hardware, firmware, embedded logic component, or a combination of two or more such components implementing particular embodiments of this disclosure.

It is to be noted that the terms "coupled" and "couplable" should not be interpreted as being restricted to direct connections only. Thus, the scope of the expression "a device A coupled to a device B" should not be limited to devices or systems wherein an output of device A is directly connected to an input of device B, and/or vice-versa. It means that there exists a path between an output of A and an input of B, and/or vice-versa, which may be a path including other devices or means.

As used in the present disclosure, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a server or an user device, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in present disclosure, including in any claims if applicable. As a further example, as used in the present disclosure, the term circuitry also covers an implementation of merely a hardware circuit or processor (or multiple processors) or portion of a hardware circuit or processor and its (or their) accompanying software and/or firmware.

It should further be noted that the description and drawings merely illustrate the principles of the present disclosure. Those skilled in the art will be able to implement various arrangements that, although not explicitly described or shown herein, embody the principles of the present disclosure and are included within its spirit and scope. Furthermore, all examples and embodiment outlined in the present disclosure are principally intended expressly to be only for explanatory purposes to help the reader in understanding the principles of the proposed method. Furthermore, all statements herein providing principles, aspects, and embodiments of the present disclosure, as well as specific examples thereof, are intended to encompass equivalents thereof.

The invention claimed is:

1. A network node, comprising:
 at least one processor and at least one memory including computer program code, wherein the at least one memory and the computer program code are configured to, with the at least one processor, cause the network node at least to perform:
 receiving supply power from an apparatus via a transmission line;
 performing a line measurement on the transmission line during a period of time when the apparatus is disconnected from the transmission line;
 signaling to the apparatus to disconnect from the transmission line; and
 applying an invalid or no predefined signature to the transmission line or violating a power constraint for drawing supply power provided from the apparatus.

2. The network node of claim 1, wherein the at least one memory and the computer program code are further configured to, with the at least one processor, cause the network node at least to apply the invalid or no predefined signature to the transmission line prior to or during a start-up phase of the reception of the supply power from the apparatus.

3. The network node of claim 1, wherein the at least one memory and the computer program code are further configured to, with the at least one processor, cause the network node at least to perform the violation of the power constraint during an operational phase of the network node and reception of the supply power from the apparatus.

4. The network node of claim 1, wherein the at least one memory and the computer program code are further configured to, with the at least one processor, cause the network node at least to perform violation of the power constraint by drawing a current below or above a predefined limit from the transmission line.

5. The network node of claim 4, wherein the at least one memory and the computer program code are further configured to, with the at least one processor, cause the network node at least to perform violation of the power constraint during an operational phase of the network node and reception of the supply power from the apparatus.

6. The network node of claim 1, wherein the at least one memory and the computer program code are further configured to, with the at least one processor, cause the network node at least to further perform:
  detecting disconnection of the apparatus from the transmission line by monitoring a quantity indicative of a voltage on the transmission line.

7. The network node of claim 1, wherein the at least one memory and the computer program code are further configured to, with the at least one processor, cause the network node at least to further perform:
  signaling to the apparatus via the transmission line for reconnecting the apparatus back to the transmission line.

8. The network node of claim 7, wherein, for signaling to the apparatus via the transmission line for reconnecting the apparatus back to the transmission line, the at least one memory and the computer program code are further configured to, with the at least one processor, cause the network node at least to further perform:
  applying to the transmission line at least one of an alternating current signal or a predetermined direct current voltage.

9. The network node of claim 1, wherein the at least one memory and the computer program code are further configured to, with the at least one processor, cause the network node at least to further perform:
  communicating with an end user device via a communications network over the transmission line.

10. An apparatus, comprising:
  at least one processor and at least one memory including computer program code, the at least one memory and the computer program code being configured to, with the at least one processor, cause the apparatus at least to perform:
    providing supply power to a network node coupleable to the apparatus via a transmission line;
    monitoring at least one electrical parameter of the transmission line; and
    disconnecting the apparatus from the transmission line if a predetermined line condition or a power violation is detected such that the network node can perform a measurement on the transmission line, wherein the predetermined line condition comprises an invalid or absent predefined signature of the network node, wherein the at least one memory and the computer program code are further configured to, with the at least one processor, cause the apparatus at least to detect the predetermined line condition prior to or during a start-up phase prior to the provision of supply power to the network node.

11. The apparatus of claim 10, wherein, for monitoring the at least one electrical parameter of the transmission line, the at least one memory and the computer program code are further configured to, with the at least one processor, cause the apparatus at least to further perform:
  applying a predetermined voltage on the transmission line; and
  measuring a quantity indicative of an impedance or current on the transmission line.

12. The apparatus of claim 10, wherein the at least one memory and the computer program code are further configured to, with the at least one processor, cause the apparatus at least to detect the power violation during an operational phase of the apparatus and the provision of supply power to the network node.

13. The apparatus of claim 10, wherein the power violation comprises a current drawn by the network node below or above a predefined limit.

14. The apparatus of claim 13, wherein the at least one memory and the computer program code are further configured to, with the at least one processor, cause the apparatus at least to detect the power violation during an operational phase of the apparatus and the provision of supply power to the network node.

15. The apparatus of claim 10, wherein, for disconnecting the apparatus from the transmission line, the at least one memory and the computer program code are further configured to, with the at least one processor, cause the apparatus at least to further perform:
  ceasing to provide supply power to the network node; and
  providing a sufficiently high impedance on the transmission line so as not to impact the line measurement.

16. The apparatus of claim 10, wherein the at least one memory and the computer program code are further configured to, with the at least one processor, cause the apparatus at least to further perform:
  disconnecting the apparatus from the transmission line for a predefined period of time and reconnecting back to the transmission line after expiration of the predefined period of time.

17. The apparatus of claim 10, wherein the at least one memory and the computer program code are further configured to, with the at least one processor, cause the apparatus at least to further perform:
  monitoring at least one second electrical parameter of the transmission line after the apparatus is disconnected from the transmission line; and
  reconnecting, if a further predetermined line condition is detected by the apparatus by monitoring at least one second electrical parameter of the transmission line, the apparatus back to the transmission line, wherein the further predetermined line condition comprises at least one of an alternating current signal or a predetermined direct current voltage.

18. An end user device comprising:
  at least one processor and at least one memory including computer program code, the at least one memory and the computer program code being configured to, with the at least one processor, cause the end user device at least to perform:
    providing supply power to a network node coupleable to the end user device via a transmission line;
    monitoring at least one electrical parameter of the transmission line; and
    disconnecting the end user device from the transmission line if a predetermined line condition or a power violation is detected such that the network node can perform a measurement on the transmission line, wherein the predetermined line condition comprises an invalid or absent predefined signature of the network node, wherein the at least one memory and the computer program code are further configured to, with the at least one processor, cause the end user device at least to detect the predetermined line condition prior to or during a start-up phase prior to the provision of supply power to the network node.

19. A method for operating a network node, comprising:

receiving, by the network node, supply power from an apparatus coupled to the network node via a transmission line;

performing, by the network node, a line measurement on the transmission line during a period of time when the apparatus is disconnected from the transmission line;

signaling, by the network node to the apparatus, to disconnect from the transmission line; and applying, by the network node, an invalid or no predefined signature to the transmission line or violating, by the network node, a power constraint for drawing supply power provided from the apparatus.

20. A method for operating an apparatus, comprising:

providing, by the apparatus, supply power to a network node coupled to the apparatus via a transmission line;

monitoring, by the apparatus, at least one electrical parameter of the transmission line; and disconnecting, by the apparatus, the apparatus from the transmission line if a predetermined line condition or a power violation is detected such that the network node can perform a measurement on the transmission line, wherein the predetermined line condition comprises an invalid or absent predefined signature of the network node, wherein the predetermined line condition is detected prior to or during a start-up phase prior to the provision of supply power to the network node.

* * * * *